United States Patent [19]

Justice

[11] 4,145,166
[45] Mar. 20, 1979

[54] DISPLACEMENT PUMP

[75] Inventor: Orien N. Justice, Dallas, Tex.

[73] Assignee: Camact Pump Corp., Dallas, Tex.

[21] Appl. No.: 747,884

[22] Filed: Dec. 6, 1976

[51] Int. Cl.² .................. F04B 39/00; F16H 37/06
[52] U.S. Cl. ............................ 417/519; 417/532; 417/534; 74/665 P; 74/58
[58] Field of Search .............. 417/519, 534, 532, 410; 74/57, 58, 665 P; 92/33; 137/625.4

[56] References Cited

U.S. PATENT DOCUMENTS

| | | | |
|---|---|---|---|
| 2,516,388 | 7/1950 | Humphreys | 417/519 X |
| 2,705,592 | 4/1955 | Reiser | 417/534 |
| 3,136,255 | 6/1964 | von Plato | 417/519 |
| 3,302,660 | 2/1967 | Haag | 137/625.24 |
| 3,543,064 | 11/1970 | Holper | 74/665 P X |
| 3,677,665 | 7/1972 | Corkill | 417/410 |

FOREIGN PATENT DOCUMENTS 101466  7/1922  Switzerland .................. 417/534

Primary Examiner—William L. Freeh
Assistant Examiner—R. E. Gluck
Attorney, Agent, or Firm—Thomas L. Cantrell; Joseph H. Schley

[57] ABSTRACT

Disclosed is a displacement pump especially suited for use in very small well bores. The pump includes a piston working in a cylinder, driven by a rotating cam shaft having closed loop cams for effecting reciprocation of the piston. The rotating cam shaft carries spool valves for positive control of liquid flow into and out of the pumping chambers. Also disclosed is a transmission mechanism especially suitable for use in reducing the speed of an electric motor power source to a level suitable for driving the cam shaft. The pump includes a small diameter high speed electric motor, on which is mounted the transmission mechanism, which in turn carries the pumping mechanism. An electrical power conduit runs through the pumping mechanism and transmission mechanism to the motor.

19 Claims, 20 Drawing Figures

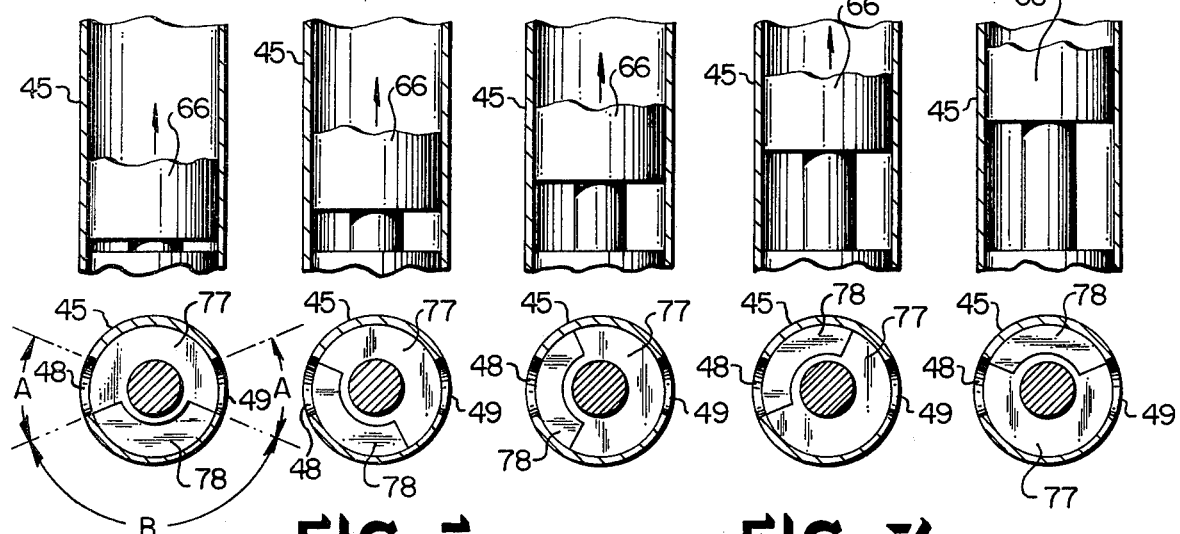
FIG.4  FIG.6  FIG.8
FIG.5  FIG.7
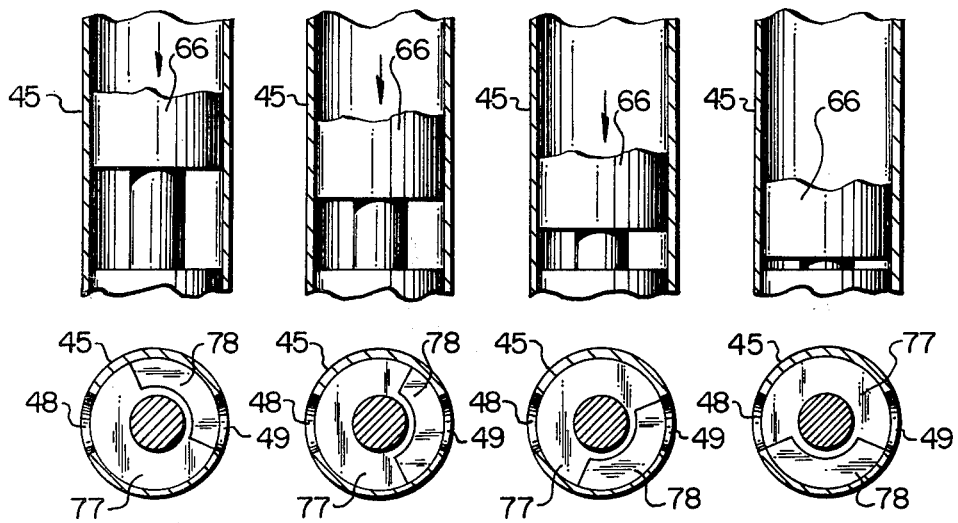
FIG.10  FIG.12
FIG.9  FIG.11

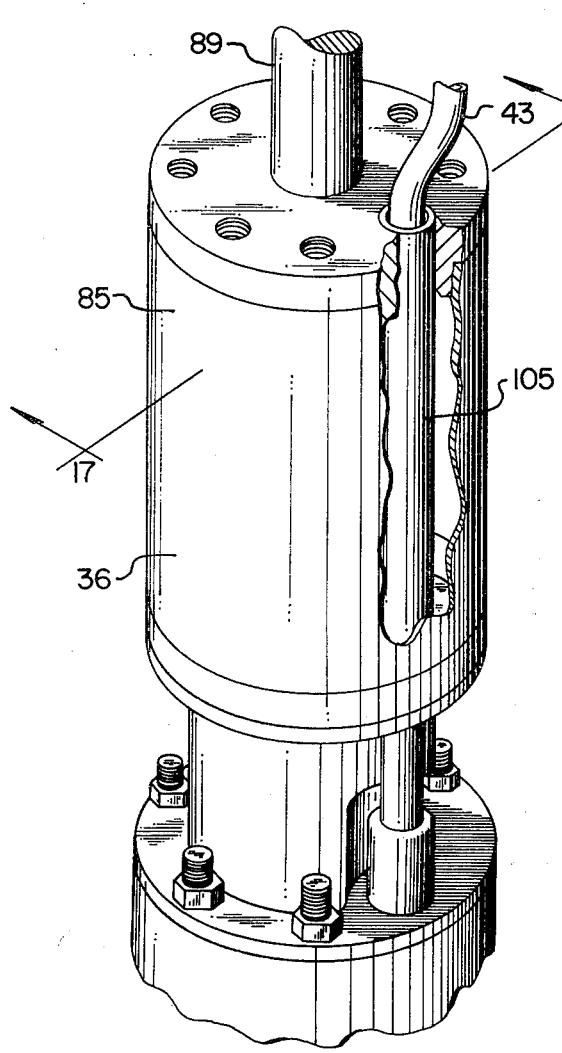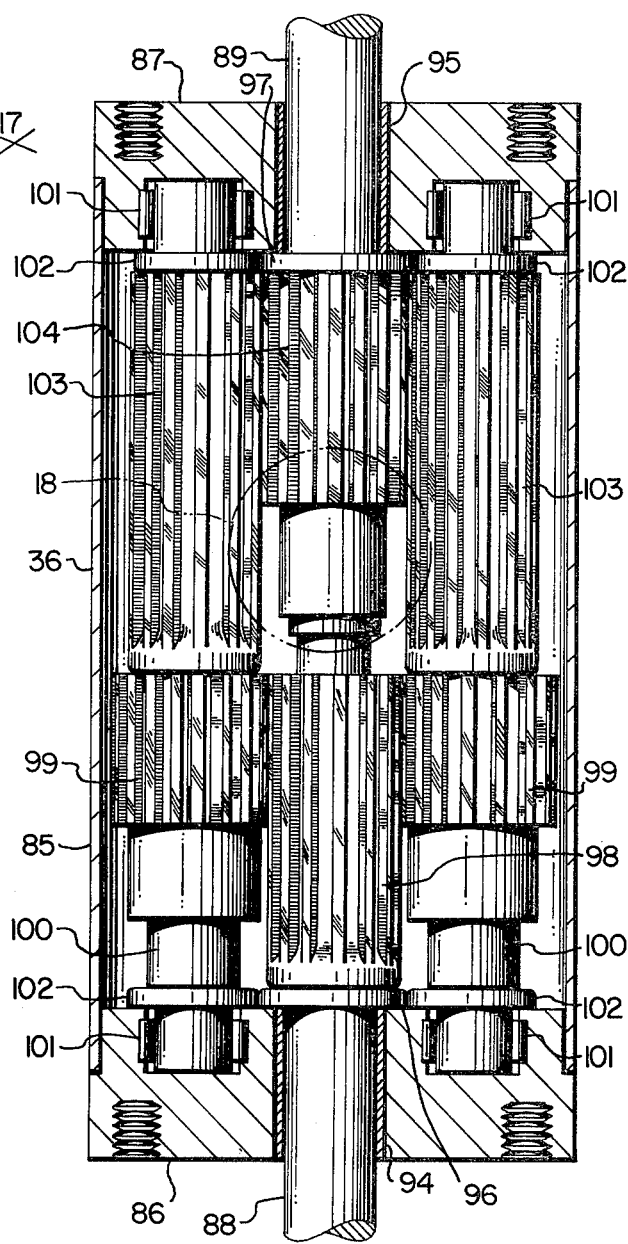

DISPLACEMENT PUMP

BACKGROUND OF THE INVENTION

To date, submersible pumps have not proved particularly satisfactory for use in stripper wells producing oil from older oil fields. As a consequence, most oil well pumps are of the walking beam type, with the power source located at the surface of the ground. One difficulty has been in devising a suitable pump of a diameter small enough to fit in small diameter casing, such as "4" casing, which is common in many older wells.

Cam driven piston devices, broadly considered, have been proposed in the past. See, for example, U.S. Pat. Nos. 165,027; 660,681; 2,291,601 and 2,508,253. A particularly effective cam follower mechanism is illustrated in U.S. Pat. No. 3,792,616.

SUMMARY OF THE INVENTION

In accordance with the invention, a displacement pump is provided which is especially suited for use in very small well bores, although the invention is useful in various other pumping applications. The displacement pump includes an electric motor of small diameter and high rotative speed. Mounted on top of the electric motor is a rugged, small diameter transmission mechanism having axially aligned input and output shafts. Mounted on the transmission mechanism is a pump mechanism.

The pump mechanism includes a cylinder having inlet and outlet ports in its walls at each end, a manifold housing surrounding the cylinder and providing an output chamber in communication with the outlet ports of the cylinder and inlet lines for delivering liquid, such as oil, to the inlet ports of the cylinder.

Within the cylinder there is mounted a cam shaft, connected to and driven by the output shaft of the transmission mechanism. The cam shaft is axially aligned in the cylinder and is aligned with the transmission output shaft. The cam shaft has at least one, and preferably a plurality of, closed loop inclined cam grooves on its surface in the mid region thereof. A double acting piston is mounted for reciprocation in the cylinder and on the shaft. The stroke of the piston is generally in the region of the cylinder between the inlet and outlet ports located near the ends of the cylinder.

In the wall of the piston are mounted "roll nuts" or pin followers, or other suitable cam followers, one being provided for each of the cam grooves in the cam shaft. These cam followers ride in the cam grooves of the shaft. As the shaft is rotated the forces exerted by the cam groove on the cam followers, and in turn upon the piston itself, move the piston back and forth in the cylinder.

The piston is restrained from rotating with the cam shaft by means mounted on the wall of the cylinder. These are preferably in the form of one or more pin followers running in a groove in the outer wall of the piston which is parallel to the axis of the piston.

The cam shaft also carries a pair of spool valves, one at each end. The spool valves are mounted for rotation with the cam shaft and each has a gate portion arranged to uncover the inlet and outlet ports in the cylinder wall at selected times. Preferably, the spool valve at one end of the cylinder is mounted to open the inlet port at that end of the cylinder at a time when the outlet port at the opposite end of the cylinder is open. In this manner substantially continuous pumping action is provided for.

According to the preferred construction, the inlet and outlet ports in the cylinder walls at each end of the cylinder are located on opposite sides of the cylinder and subtend equal angles, that is, are of equal angular extent. The angular extent of the gate portions of each of the spool valves is preferably such that this angle plus the angular extent of one port is substantially equal to 180 degrees. It is also preferred that the gate portion subtend an angle larger than the angle subtended by a port. By these arrangements of ports and valves, the time of port opening per cycle is maximized, the pressure drop across the port and valve is minimized, and efficiency is thereby increased.

Desirably, the cam grooves and cam followers on the shaft and piston respectively are kept clean and well lubricated, and isolated from the working fluid of the pump, particularly when that fluid is water or crude oil, both of which are "dirty" and corrosive to the parts. To this end, it is preferred that seals be provided between the shaft and piston above and below the cam grooves and cam followers to establish a sealed lubrication zone which may be filled with a suitable lubricant.

From the foregoing it can be seen that a principal object of this invention is the provision of a compact and efficient displacement pump which is particularly suitable for use as a submersible pump in wells of small bore.

Another object of the invention is the provision of a displacement pump of the cam driven type which is simple and rugged in construction.

The manner in which these objects and purposes, together with other objects and purposes, are achieved can best be understood by a consideration of the detailed description which follows, together with the accompanying drawings.

DESCRIPTION OF THE DRAWINGS

FIGS. 4 through 12 are sequential diagrammatic views of the bottom valve and the lower portion of the piston of the pump of FIG. 1, showing their relative positions during different stages of a pumping stroke.

FIG. 16 is a fragmentary perspective view, on an enlarged scale, and partly broken away, of a transmission mechanism constructed in accordance with the invention;

FIG. 17 is a sectional elevational view of the transmission of FIG. 16, the section being taken on the line 17—17 of FIG. 16.

FIG. 18 is a fragmentary sectional view of the portion of the transmission encircled by the line 18 in FIG. 17.

FIG. 19 is a plan view, on a reduced scale, of the transmission of FIG. 17; and

FIG. 20 is a fragmentary elevational view, partly in section, of an alternate form of the transmission mechanism of the invention.

DESCRIPTION OF THE PREFERRED EMBODIMENTS

Figure 1:
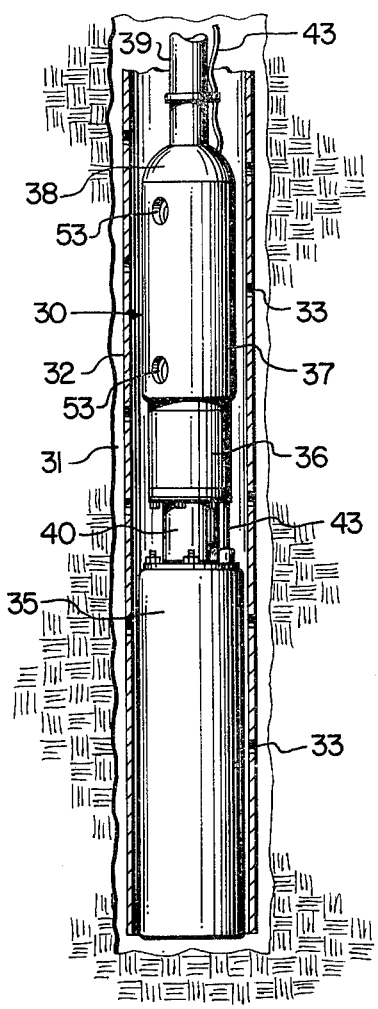
FIG. 1 is an elevational view, partly in section, of a pump constructed in accordance with the invention in place at the bottom of a well bore.
Figure 13:
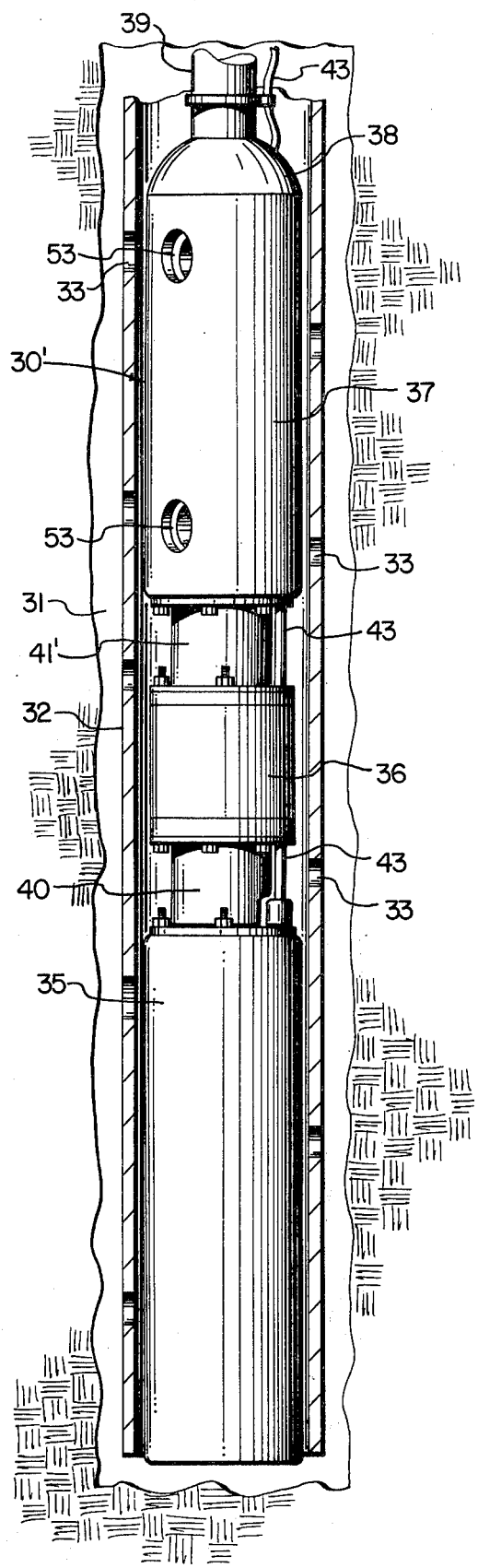
FIG. 13 is an elevational view, similar to FIG. 1, of an alternate construction of a pump in accordance with the invention.

Attention is first directed to FIGS. 1 and 13, which show in elevation two forms of the pump of the invention, designated generally as 30 and 30' respectively in the two FIGS. The pumps are shown in place at the bottom of a well bore 31 inside a well casing 32, which has perforations 33 near its lower end to permit oil to flow from the formation into the casing.

The pump comprises three main sections: a small diameter, high-speed electric motor 35, surmounted by a transmission mechanism 36, which is in turn surmounted by pumping mechanism 37. A header 38 connects the upper end of the pumping mechanism 37 to tube 39, leading to the surface of the ground.

Pumps 30 and 30' of FIGS. 1 and 13, respectively, differ from one another in that pump 30 has a single shaft coupling housing 40 interposed between motor 33 and transmission 36, while pump 30' has an additional shaft coupling housing 41' interposed between transmission 36 and pumping mechanism 37.

FIG. 20 illustrates a shaft coupling 42 inside housing 41". Also shown in this FIG. is a pump constructed with two transmission mechanisms 36a and 36b, or alternately stated, a two-stage transmission, to give greater speed reduction and torque multiplication for heavy duty service.

Returning to FIGS. 1 and 13, it can be seen that the pumps of the invention are provided with an electrical power conduit 43 which enters the pump from the top, passes through the pump mechanism 37 and transmission mechanism 36, and beside coupling housing 40 to enter motor 35 at its top for supplying power thereto. The manner in which conduit 43 is passed through pump mechanism 37 and transmission mechanism 36 is discussed below in the detailed description of these components. This arrangement is of great importance and advantage in pumps for small bore wells where the pump diameter is only a fraction of an inch less than the inside diameter of the wall casing.

Figure 2:
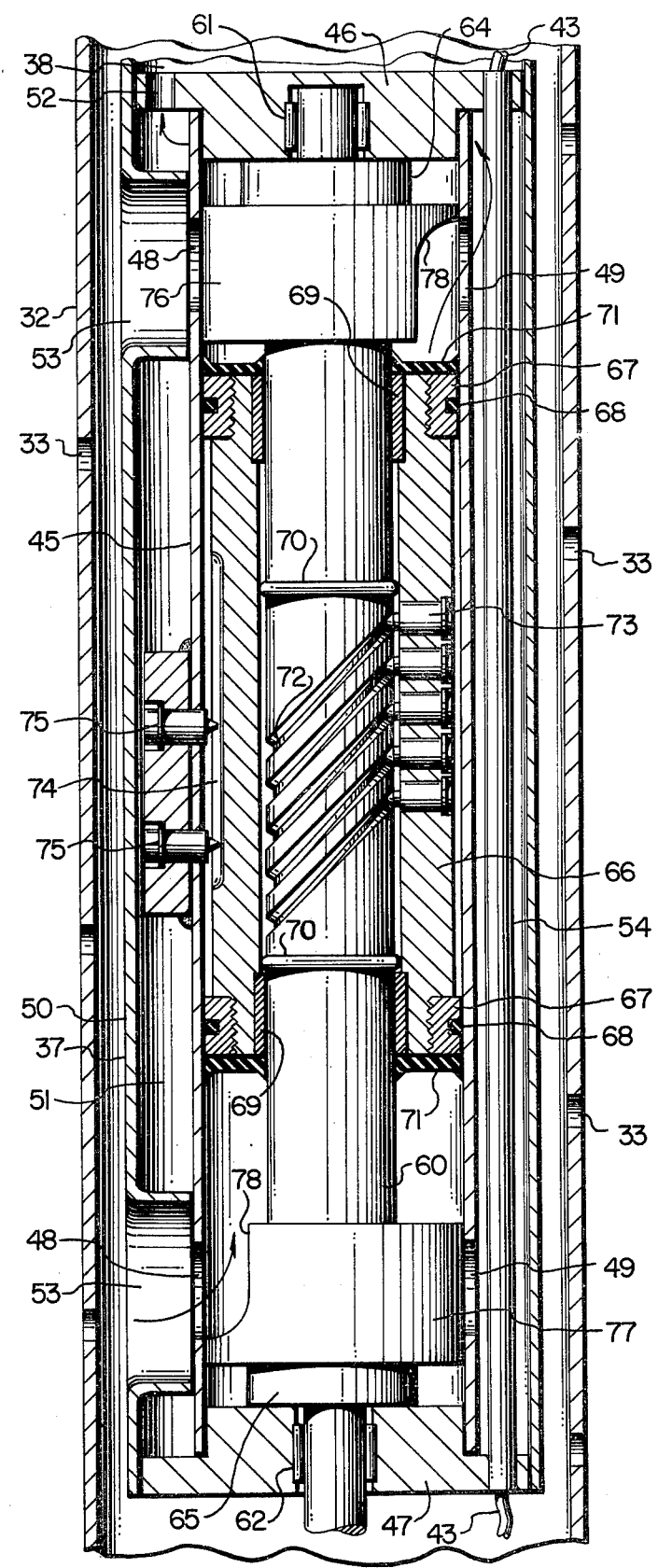
FIG. 2 is a sectional elevational view, on an enlarged scale, of the pump mechanism of the pump of FIG. 1.

The structure of pumping mechanism 37 can be best understood from a consideration of FIG. 2. The pumping mechanism comprises a cylinder 45, closed at its ends by end plates 46, 47. At its upper and lower ends, cylinder 45 is provided with inlet ports 48 and outlet ports 49 in the sidewalls of the cylinder.

Surrounding cylinder 45 is an output manifold housing 50, which also engages end plates 46, 47 to form a closed output chamber 51. Output chamber 51 is generally annular in shape (cross-section) and is defined by housing 50 and cylinder 45, together with the end plates. Upper end plate 46 is provided with one or more apertures 52 for permitting liquid flow from chamber 51 into header 38.

The upper and lower outlet ports 49 provide for liquid communication between the interior of cylinder 45 and output chamber 51. Short inlet lines 53 provide liquid communication between inlet ports 48 and the exterior of housing 50, and block communication between the inlet ports and chamber 51.

Power conduit 43 passes through end plates 46, 47 and chamber 51 enclosed in a protective tubing 54.

A cam shaft 60 is axially mounted in cylinder 45 by being stub-journaled into upper end plate 46 and through-journaled in lower end plate 47. Shaft 60 is provided with anti-friction bearings 61, 62 and with thrust bushings 64, 65.

Double-acting piston 66 is mounted for reciprocation in cylinder 45, and upon shaft 60. Bushings 67 and O-rings 68 provide a snug sliding fit between the piston and cylinder at the ends of the piston, and bushings 69 and O-rings 70 provide a similar snug sliding fit between the piston and cam shaft 60 at the ends of the piston.

The O-rings 70 on shaft 60 establish a sealed zone between them in which the cam drive mechanism discussed below operates. This sealed zone is desirably packed with lubricant. The lubricant and the seals serve to keep the dirty working fluid, typically crude oil, away from the cam drive mechanism.

The upper and lower faces of piston 66 are provided with annular elastomeric sealing members 71, which have fillets at their margins so that the working fluid will urge the sealing member into tighter sealing engagement with the cylinder wall and the cam shaft surface during a driving stroke of the piston.

In the sealed zone between O-rings 70, a series of parallel closed-loop inclined cam grooves 72 are formed on cam shaft 60. At least one such groove is required; the greater the number of grooves, the more the operating load is distributed among them. A series of cam follower elements 73 is arranged vertically in the wall of piston 66, with one follower in engagement with each of the cam grooves. Anti-friction followers of the roll bearing or ball bearing type are preferred; those shown and described in above mentioned U.S. Pat. No. 3,792,616 are quite suitable.

Piston 66 has a groove 74 formed in its outer surface which is aligned parallel to the axis of the piston. The length of groove 74 is greater than the length of the stroke of the piston. Mounted on the wall of cylinder 45 are a pair of roll nuts or other suitable follower means 75 engaging groove 74. These means restrain piston 66 from rotating with shaft 60 while permitting the piston to reciprocate on the shaft and in the cylinder.

Two spool valves 76, 77 are mounted on shaft 60 for rotation therewith. If it is desired, one of the valves may be made integral with shaft 60, but considerations of convenience in assembly make it less desirable that both valves be so constructed.

Figure 3:
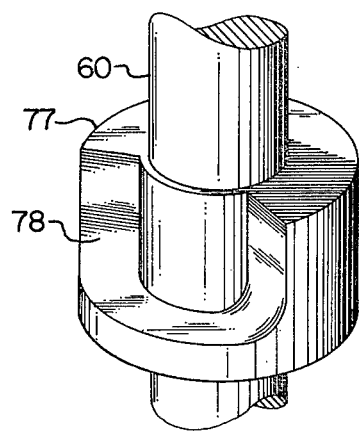
FIG. 3 is a perspective view of a spool valve of the pump of the invention.

Valve 76 rotates in cylinder 45 at the upper end thereof where upper inlet port 48 and upper outlet port 49 are located. Valve 77 is positioned for rotation in the lower end of cylinder 45 where lower inlet port 48 and lower outlet port 49 are located. As can be seen from a consideration of FIGS. 2 and 3, each spool valve has a generally cylindrical solid body with a gate portion 78 where the material of the cylinder has been removed. The cylindrical body of the valve is taller than the height of ports 48, 49 so that when the body portion of the valve is adjacent a port, it closes the port completely. On the other hand, the gate portion 78 is of a depth greater than the height of a port, so that when the gate portion is adjacent a port, the port is open over its full height.

In the preferred construction shown in FIG. 2, valves 76 and 77 are mounted on shaft 60 with their gate portions 78 facing in opposite directions, so that when lower inlet port 48 is open, upper inlet port 48 is closed, and vice versa. The same is also true, of course, of the outlet ports 49.

With the foregoing description of the structure of the pumping mechanism of the invention in hand, its mode of operation can now be outlined. As camshaft 60 is rotated one half of a revolution from the position illustrated in FIG. 2, progressively lower sections of cam grooves 72 come into contact with cam followers 73 on piston 66. The piston is restrained from rotation with the shaft by the interaction of groove 74 and followers 75, so the relative angular position of cam followers 73 remains constant. As a consequence, piston 66 moves downwardly on shaft 60 as cam followers 73 ride in the progressively lower sections of cam grooves 72. When the half revolution is completed, the piston is at the bottom of its stroke. Upon the succeeding half revolution, followers 73 and piston 66 are driven upwardly to the position shown in FIG. 2, where the piston is at the top of its stroke.

In the pumping chamber within cylinder 45 at the top of piston 66, an upstroke of the piston is an exhaust or pumping stroke, with outlet port 49 open, while a downstroke of the piston 75 is an intake stroke, with inlet port 48 open. In the pumping chamber at the bottom of piston 66, just the reverse is true: a downward stroke is a pumping stroke and an upward stroke is an intake stroke.

The actions of the valves and the pistons are positively coordinated since both are directly connected to and driven by the shaft. The coordinated actions can best be understood by a consideration of FIGS. 4–12, each of which shows in elevation the lower end of piston 66 working in cylinder 45, and in plan view spool valve 77, working in cylinder 45 between inlet port 48 and outlet port 49.

A consideration of FIG. 4 and particularly the dashed lines thereon will show that ports 48, 49 are opposed to each other across the cylinder and that they subtend equal angles "A". The gate portion 78 of spool valve 77 subtends an angle "B" which is greater than the angle "A", and the sum of one angle "A" and angle "B" is substantially 180 degrees. In this manner, the time that the appropriate port is open during a cycle is maximized and the pressure drop across the port is minimized.

In FIG. 4, piston 66 is at bottom dead center, and valve 77 is closing both ports 48 and 49. In FIGS. 5–7, piston 66 is moving progressively upwardly in its upstroke, and gate portion 78 of valve 77 is aligned with inlet port 48, allowing oil to be drawn into the pumping chamber. During most of the piston upstroke, port 48 is completely open.

FIG. 8 shows piston 66 at top dead center, with valve 77 closing both ports 48 and 49. FIGS. 9–11 show successive stages in the downstroke of the piston during which the gate portion 78 of valve 77 is opposite outlet port 49, thus allowing oil to be driven out of the pumping chamber. FIG. 12 shows the piston returned to bottom dead center, as in FIG. 4, with both ports closed. It should be noted that at no time during a cycle are both ports open, and that one port starts to be opened immediately upon completion of the closure of the other port.

Figure 14:
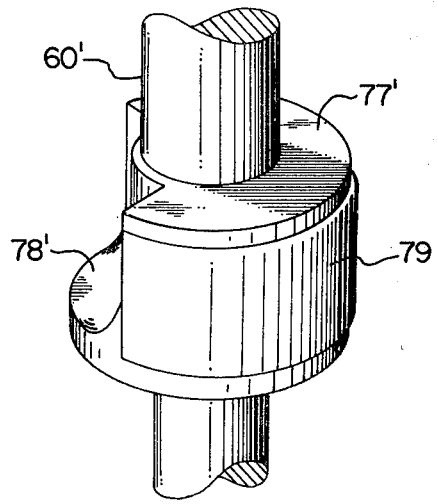
FIG. 14 is a perspective view of an alternative spool valve construction.
Figure 15:
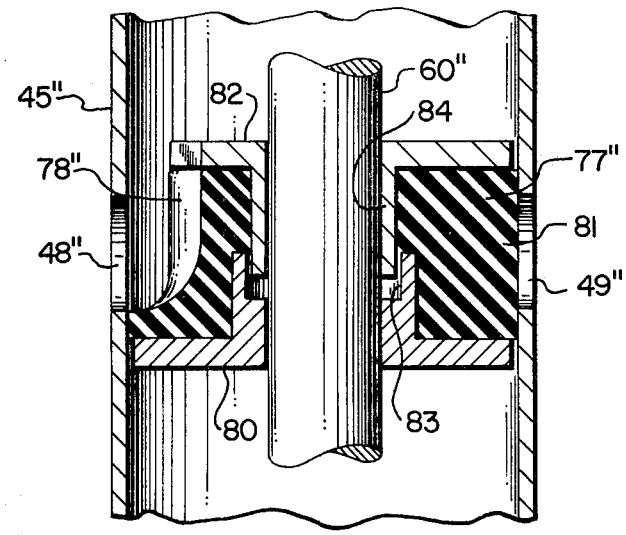
FIG. 15 is a fragmentary sectional elevational view of still another spool valve construction.

Alternate forms of valve are shown in FIGS. 14 and 15. The valve 77' of FIG. 14 differs from that of FIGS. 2 and 3 in that the outer surface of the cylindrical portion of the spool valve has a thin layer 79 of elastomeric material bonded to it. The elastomeric material aids in forming a secure seal between the valve and the ports past which the valve is rotating.

The valve 77" of FIG. 15 is made up of three parts: a bottom plate 80, which is fixed to shaft 69"; an elastomeric body 81, mounted on plate 80; and a top plate 82, slidingly fitted on shaft 60". Plates 80 and 82 are provided with telescoping sleeves 83 and 84 respectively. When the piston is moving in a pumping stroke, and the valve is sealing inlet port 48", liquid pressure on plate 82 tends to compress elastomeric material 81 to form a tight seal against the port. This effect is not as pronounced during an intake stroke, but leakage through the outlet port 49" is relatively less objectionable.

The structure of the transmission mechanism of the invention may be understood from a consideration of FIGS. 16–20. The transmission 36 includes a cylindrical case 85, with end plates 86, 87. Input shaft 88 from the electric motor is axially aligned with output shaft 89 leading to the pumping mechanism. As can best be seen in FIG. 18, a cavity 90 is formed in the end of output shaft 89, and the end of input shaft 88 is journaled into it. Anti-friction bearing 91 is mounted in cavity 90, and a thrust washer 92 is interposed between the end of shaft 89, and a shoulder 93 on shaft 88.

By these arrangements shafts 88 and 89 are made mutually supporting at their ends even though they are free to rotate at different speeds. The mutual support reduces stress and vibration of the shafts.

Shaft 88 is journaled through end plate 86 with a fluid-tight bushing 94, and shaft 89 is similarly journaled through end plate 87 with fluid-tight bushing 95.

Both shafts are provided with thrust washers 96, 97. Input shaft 88 carries pinion 98, which may desirably be formed integrally with it. Pinion 98 meshes with a pair of gears 99, carried on shafts 100, which are journaled into end plates 86, 87, by means of antifriction bearings 101. Shafts 100 are also provided with thrust washers 102. Shafts 100 carry a second set of gears 103, which mesh with a pinion 104 on shaft 89. The gears and pinions are desirably formed integrally with shafts 89 and 100. The use of a pair of idler shafts 100 on opposite sides of input and output shafts 88 and 89 divides the load between them, and through the lateral support given the main shafts, minimizes vibration.

This arrangement also makes efficient use of the restricted diameter available for a transmission for use in a small bore well. The gear diameter and numbers of teeth may be selected to provide a speed reduction of 3:1 even in a gearbox less then four inches in diameter. If greater speed reduction is desired or required, transmission units may be stacked in tandem, as illustrated by units 36a and 36b in FIG. 20.

As can be seen in FIGS. 16 and 19, there is space in housing 85 to run a tube 105 through the casing beside the gear train, and to run cable 43 through the tubing.

I claim:
1. A submersible well pump adapted for use in a well of small bore comprising:
   a generally cylindrical electric motor having an axially aligned drive shaft;
   a speed reducing transmission mounted on the top end of said motor, said transmission having an input shaft aligned with and connected to the drive shaft of said motor and having an output shaft aligned with said input shaft;
   a cam-driven piston pump mounted on the top end of said transmission, said pump having a cam shaft aligned with and connected to the output shaft of said transmission, said cam shaft having at least one unidirectionally inclined generally elliptical cam groove on its surface, a piston having a cam follower therein engaging said cam groove, said piston being mounted for reciprocation on said cam shaft, sealing means between said cam shaft and said piston between the ends of said piston and said cam groove for establishing a sealed lubrication zone surrounding said cam groove, rotary valves mounted on said camshaft above and below said piston, a cylinder enclosing said piston, valves, and shaft;

and an electrical power supply cable connected to said motor at the top end thereof and passing upwardly through said transmission and past said cylinder.

2. A submersible well pump in accordance with claim 1 in which said transmission comprises two stages connected in tandem with the output shaft of the first stage aligned with and connected to the input shaft of the second stage.

3. A submersible well pump in accordance with claim 1 in which at least one shaft coupling is interposed between said motor and said piston pump.

4. A pump in accordance with claim 1 in which said cam shaft has a plurality of parallel unidirectionally inclined cam grooves on its surface, in which said piston has a corresponding plurality of cam followers therein engaging said cam grooves, and in which said piston has a length exceeding the length of the throw of said cam grooves.

5. A submersible well pump in accordance with claim 1 in which said speed reducing transmission comprises:
a housing;
input and output shafts mounted for rotation in said housing axially thereof, said shafts being axially aligned with each other and rotatively interconnected at their ends in mutually supporting relationship;
said input and output shafts each having a pinion mounted thereon for rotation therewith;
a pair of idler shafts mounted for rotation in said housing on opposite sides of said input and output shafts;
each of said idler shafts carrying a pair of gears, each of said gears being meshed with a pinion;
and an electrical conduit protective tube running lengthwise through said housing, said tubing being angularly offset from said idler shafts.

6. A pump comprising:
a cylinder having opposed inlet and outlet ports in the wall thereof at each end thereof;
an output manifold housing surrounding said cylinder and defining therewith a generally annular output chamber in communication with said outlet ports;
inlet means providing liquid flow communication between the exterior of said housing and said inlet ports, and blocking liquid communication between said inlet ports and said output chamber;
a cam shaft mounted in said cylinder axially thereof for rotation therein, said shaft having at least one inclined closed-loop cam groove on its surface;
a double-acting piston mounted for reciprocation in said cylinder on said shaft between said ports;
cam follower means in said piston engaging said cam groove;
means on said cylinder wall for preventing rotation of said piston;
and a spool valve mounted on said shaft at each end thereof for rotation therewith, each of said spool valves having a gate portion for uncovering said inlet and outlet parts sequentially; and further comprising a pair of end plates closing said cylinder and said outlet manifold, said shaft being stub-journaled into one of said plates and through-journaled in the other for rotation, and said one plate being apertured to admit flow therethrough from said output chamber.

7. A pump in accordance with claim 6 and further comprising an electric power conduit passing through said end plates and said output chamber.

8. A pump comprising:
a cylinder having opposed inlet and outlet ports in the wall thereof at each end thereof;
an output manifold housing spaced radially outward from said cylinder comprising a generally annular output chamber in communication with said outlet ports;
inlet means providing liquid flow communication between the exterior of said housing and said inlet ports, and blocking liquid communication between said inlet ports and said output chamber,
a cam shaft mounted in said cylinder axially thereof for rotation therein, said shaft having at least unidirectionally inclined generally elliptical closed-loop cam groove on its surface;
a double-acting piston mounted for reciprocation in said cylinder on said shaft between said pairs of ports, said piston surrounding the portion of said shaft having said cam groove therein and having a length greater than the length of the throw of said cam groove;
cam follower means in said piston engaging said cam groove;
means on said cylinder wall for preventing rotation of said piston;
a spool valve mounted on said shaft at each end thereof for rotation therewith, each of said spool valves having a gate portion for uncovering said inlet and outlet parts sequentially
and further comprising sealing means between said shaft and said piston between the ends of said piston and said cam groove for establishing a sealed lubrication zone surrounding said cam groove.

9. A pump in accordance with claim 8 in which said opposed inlet and outlet ports subtend equal angles and are diametrically opposed, and in which the gate portion of the associated spool valve subtends an angle such that the sum of the gate angle and one port angle is substantially 180 degrees.

10. A pump in accordance with claim 9 in which the gate portion of the associated spool valve subtends an angle larger than the angle subtended by a port.

11. A pump comprising:
a cylinder having opposed inlet and outlet ports in the wall thereof adjacent an end thereof;
a cam shaft mounted in said cylinder axially thereof for rotation therein, said shaft having at least one inclined closed-loop cam groove on its surface;
a piston mounted for reciprocation in said cylinder on said shaft adjacent said ports;
cam follower means in said piston engaging said cam groove;
means on said cylinder wall for preventing rotation of said piston;
and a spool valve mounted on said shaft adjacent said ports for rotation therewith, said spool valve having a gate portion for uncovering said inlet and outlet ports sequentially;
and further comprising sealing means between said shaft and said piston between the ends of said piston and said cam groove for establishing a sealed lubrication zone surrounding said cam groove.

12. A pump in accordance with claim 8 in which said spool valves have generally cylindrical outer surfaces and said surfaces are coated with an elastomer.

13. A pump in accordance with claim 8 in which said spool valves comprise an elastomer generally cylindrical body sandwiched between metal plates.

14. A pump in accordance with claim 8 in which said cam shaft has a plurality of parallel unidirectionally inclined cam grooves on its surface, in which said piston has a corresponding plurality of cam followers therein engaging said cam grooves, and in which said piston has a length exceeding the length of the throw of said cam grooves.

15. A pump in accordance with claim 11 in which said opposed inlet and outlet ports subtend equal angles and are diametrically opposed, and in which the gate portion of the associated spool valve subtends an angle such that the sum of the gate angle and one port angle is substantially 180 degrees.

16. A pump in accordance with claim 15 in which the gate portion of the associated spool valve subtends an angle larger than the angle subtended by a port.

17. A pump in accordance with claim 11 in which said cam shaft has a plurality of parallel unidirectionally inclined cam grooves on its surface, in which said piston has a corresponding plurality of cam followers therein engaging said cam grooves, and in which said piston has a length exceeding the length of the throw of said cam grooves.

18. A pump in accordance with claim 11 in which said spool valve has a generally cylindrical outer surface and said surface is coated with an elastomer.

19. A pump in accordance with claim 17 in which said spool valve comprises an elastomer generally cylindrical body sandwiched between metal plates.

* * * * *